(12) United States Patent
Ylamurto

(10) Patent No.: US 10,838,037 B2
(45) Date of Patent: Nov. 17, 2020

(54) SYSTEMS AND METHODS FOR PRECISE RADIO FREQUENCY LOCALIZATION USING NON-CONTIGUOUS OR DISCONTINUOUS CHANNELS

(71) Applicant: LOCIX Inc., San Bruno, CA (US)

(72) Inventor: Tommi Ylamurto, Los Gatos, CA (US)

(73) Assignee: Locix, Inc., San Bruno, CA (US)

( * ) Notice: Subject to any disclaimer, the term of this patent is extended or adjusted under 35 U.S.C. 154(b) by 139 days.

(21) Appl. No.: 15/684,895

(22) Filed: Aug. 23, 2017

(65) Prior Publication Data

US 2019/0064315 A1 Feb. 28, 2019

(51) Int. Cl.
*H04W 24/00* (2009.01)
*G01S 5/06* (2006.01)
(Continued)

(52) U.S. Cl.
CPC .............. *G01S 5/06* (2013.01); *G01S 5/0205* (2013.01); *G01S 5/0289* (2013.01); *H04W 64/003* (2013.01)

(58) Field of Classification Search
CPC ... H04W 64/003; H04W 84/18; H04W 24/08; H04W 24/10; H04W 40/246;
(Continued)

(56) References Cited

U.S. PATENT DOCUMENTS

| 2006/0285524 | A1* | 12/2006 | Schotten | H04B 1/0475 370/335 |
| 2007/0002797 | A1* | 1/2007 | Lai | H04W 36/06 370/331 |

(Continued)

FOREIGN PATENT DOCUMENTS

| KR | 1020120122806 A | 11/2012 |
| WO | 2014193335 A1 | 12/2014 |
| WO | 2019040560 A1 | 2/2018 |

OTHER PUBLICATIONS

International Search Report and Written Opinion for PCT Application No. PCT/US2018/047424, dated Jan. 3, 2019, 10 pages.
(Continued)

*Primary Examiner* — Joseph Arevalo
(74) *Attorney, Agent, or Firm* — Jaffery Watson Mendonsa & Hamilton LLP

(57) ABSTRACT

Systems and methods for determining locations of wireless nodes in a network architecture are disclosed herein. In one example, a method for localization of nodes in a wireless network architecture includes receiving, with processing logic of a first wireless node having a wireless device, a RF signal from a second wireless node having a wireless device, measuring, with the first wireless node, first channel state information of a first frequency channel of the RF signal, and measuring, with the first wireless node, second channel state information of a second frequency channel of the RF signal with the first and second frequency channels being non-contiguous or discontinuous channels. The method further includes determining delay profile estimation between the first and second wireless nodes based on the first and second channel state information without phase alignment.

23 Claims, 12 Drawing Sheets

(51) Int. Cl.
*H04W 64/00* (2009.01)
*G01S 5/02* (2010.01)

(58) Field of Classification Search
CPC ....... H04W 4/027; H04W 4/043; H04W 4/33; H04W 4/70; H04W 52/0219; H04W 64/00; H04W 84/22; H04W 28/04; H04W 52/02; H04W 52/0235; H04W 72/0413; H04W 72/042; H04W 74/085
USPC ..... 455/450, 509, 101, 63.4, 296, 63.1, 522, 455/69, 422.1, 456.2, 456.1, 501.45
See application file for complete search history.

(56) References Cited

U.S. PATENT DOCUMENTS

| | | | | |
|---|---|---|---|---|
| 2007/0005292 | A1* | 1/2007 | Jin | G01S 5/0289 |
| | | | | 702/150 |
| 2008/0090588 | A1* | 4/2008 | Mizugaki | H04W 84/18 |
| | | | | 455/456.1 |
| 2008/0320354 | A1* | 12/2008 | Doppler | H04L 1/04 |
| | | | | 714/748 |
| 2012/0071102 | A1* | 3/2012 | Palomar | H04W 16/14 |
| | | | | 455/63.1 |
| 2013/0170484 | A1* | 7/2013 | Kang | G01S 5/021 |
| | | | | 370/338 |
| 2014/0016485 | A1* | 1/2014 | Curticapean | G01S 5/12 |
| | | | | 370/252 |
| 2014/0079224 | A1* | 3/2014 | Nguyen | G10K 11/002 |
| | | | | 381/18 |
| 2014/0242914 | A1* | 8/2014 | Monroe | H04B 17/11 |
| | | | | 455/63.4 |
| 2014/0247775 | A1* | 9/2014 | Frenne | H04W 72/042 |
| | | | | 370/329 |
| 2015/0349995 | A1* | 12/2015 | Zhang | H04L 5/0048 |
| | | | | 375/295 |
| 2016/0198347 | A1* | 7/2016 | Zhan | H04B 1/40 |
| | | | | 455/23 |
| 2016/0295499 | A1* | 10/2016 | Tavildar | H04W 48/12 |
| 2017/0013584 | A1 | 1/2017 | Banin et al. | |
| 2017/0033958 | A1* | 2/2017 | Eitan | H04L 25/0202 |
| 2017/0332049 | A1* | 11/2017 | Zhang | H04N 7/181 |
| 2018/0063823 | A1* | 3/2018 | Sampath | H04W 72/04 |
| 2018/0219869 | A1* | 8/2018 | Kumar | H04W 12/12 |
| 2018/0324603 | A1* | 11/2018 | Hessler | H04B 7/08 |
| 2018/0352443 | A1* | 12/2018 | Hwang | H04W 16/26 |
| 2019/0053061 | A1* | 2/2019 | Sui | H04W 72/0446 |

OTHER PUBLICATIONS

International Preliminary Report for PCT Application No. PCT/US2018/047424, dated Mar. 5, 2020, 7 pages.
Notification of CN Publication for Application No. 2018800550120, 2 pages, dated Apr. 10, 2020.
Notification of EP Publication for Application No. 18848970.2, 1 page, dated May 27, 2020.

* cited by examiner

SYSTEMS AND METHODS FOR PRECISE RADIO FREQUENCY LOCALIZATION USING NON-CONTIGUOUS OR DISCONTINUOUS CHANNELS

FIELD

Embodiments of the invention pertain to systems and methods for precise radio frequency localization using non-contiguous or discontinuous channels.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Location detection of nodes in indoor wireless networks is useful and important in many applications.

Localization based on triangulation performed using radio frequency measurements is an attractive method for determining location of wirelessly equipped objects in three dimensional space. RF-based localization may be performed in numerous ways. Distances between multiple object pairs must be determined to enable calculation of relative positions in three dimensional space via triangulation based on the individual pair distances. An exemplary implementation includes a hub and multiple sensor nodes. Note that the hub may be replaced with a node, or indeed, one or more of the nodes may be replaced with a hub. Distances are estimated using radio frequency techniques between all the individual pairs via RF communications. It is difficult to measure the frequency response in the middle of a used radio channel (e.g., WiFi has a 1 MHz gap in the middle of the channel). In distance estimation the gap causes the bandwidth to be reduced in half or if ignoring the gap then this introduces error into the distance estimate.

Once the distance is estimated, triangulation may be used to determine the relative position in three dimensional space of each object. If the position of at least 2 of the objects is known in real space, then the absolute position of each object in the network may be determined. Indeed, if the position of 1 object (e.g., the hub) is known within the network, along with the angular path to at least one other node, then again the absolute position of each object within the network may be determined.

Distance measurement between object pairs is therefore a key step in RF-based localization. Distance estimation may be performed in numerous ways. Signal strength of communication (RSSI) may be measured between pairs and used to estimate distance based on known models of signal attenuation. Time of Flight (TOF) may be measured for signals transmitted between objects and distance may be estimated based on known propagation delay models. Angle of arrival (AOA) may additionally be estimated based on resolution of angular variation in signal strength. Of these, RSSI is often prone to error due to variations in attenuation, and is therefore less attractive than TOF for distance estimation.

SUMMARY

For one embodiment of the present invention, systems and methods for determining locations of wireless nodes in a network architecture are disclosed herein. In one example, a method for localization of nodes in a wireless network architecture includes receiving, with processing logic of a first wireless node having a wireless device, a RF signal from a second wireless node having a wireless device, measuring, with the first wireless node, first channel state information of a first frequency channel of the RF signal, and measuring, with the first wireless node, second channel state information of a second frequency channel of the RF signal with the first and second frequency channels being non-contiguous or discontinuous channels. The discontinuity can be, for example, due to missing frequencies in the channel state information or due to a phase offset between separate measurement instances. The method further includes determining delay profile estimation between the first and second wireless nodes based on the first and second channel state information without phase alignment.

In another example, a system for localization of nodes in a wireless network architecture includes a first wireless node having a wireless device with one or more processing units and RF circuitry for transmitting and receiving communications in the wireless network architecture including a RF signal and a second wireless node having a wireless device with one or more processing units and RF circuitry to enable bi-directional communications with the first wireless node in the wireless network architecture. The one or more processing units of the first wireless node are configured to execute instructions to receive the RF signal from the second wireless node, to measure first channel state information of a first frequency channel of the RF signal, to measure second channel state information of a second frequency channel of the RF signal with the first and second frequency channels being non-contiguous or discontinuous channels, and to determine delay profile estimation between the first and second wireless nodes based on the first and second channel state information without phase alignment.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

Figure 1:
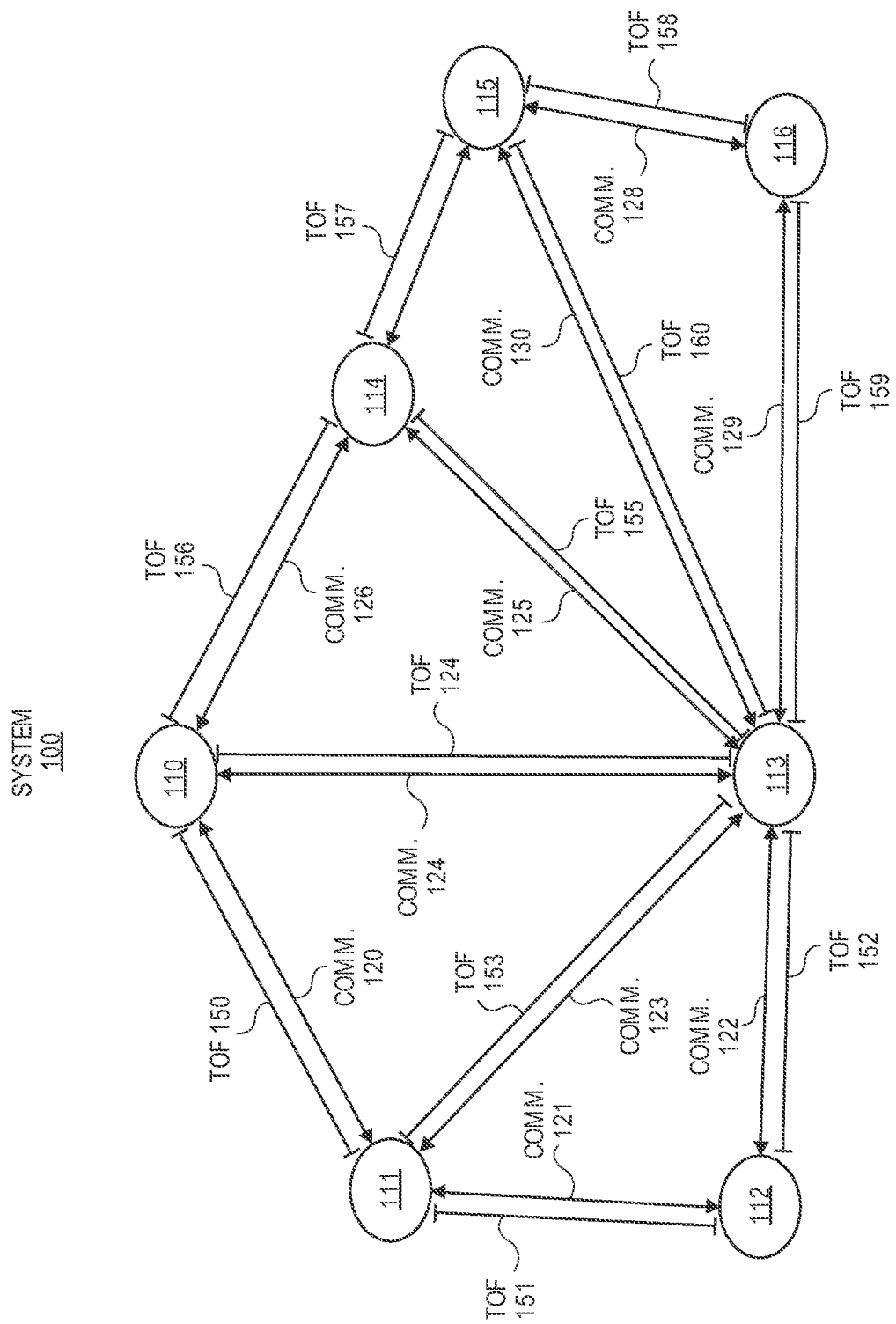
FIG. 1 illustrates an exemplar system of wireless nodes in accordance with one embodiment.

Systems and methods for precise radio frequency localization by utilizing non-contiguous or discontinuous channels are disclosed herein. In one example, a method for localization of nodes in a wireless network architecture includes receiving, with processing logic of a first wireless node having a wireless device, a RF signal from a second wireless node having a wireless device, measuring, with the first wireless node, first channel state information of a first frequency channel of the RF signal, and measuring, with the first wireless node, second channel state information of a second frequency channel of the RF signal with the first and second frequency channels being non-contiguous or discontinuous channels. The method further includes determining delay profile estimation between the first and second wireless nodes based on the first and second channel state information without phase alignment.

In various applications of wireless sensor networks, it may be desirable to determine the location of sensor nodes within the network. For example, such information may be used to estimate the relative position of sensors such as security cameras, motion sensors, temperature sensors, and other such sensors as would be apparent to one of skill in the art. This information may then be used to produce augmented information such as maps of temperature, motion paths, and multi-view image captures. Therefore, localization systems and methods are desired to enable accurate, low-power, and context-aware localization of nodes in wireless networks, particularly in indoor environments. For the purpose of this, indoor environments are also assumed to include near-indoor environments such as in the region around building and other structures, where similar issues (e.g., presence of nearby walls, etc.) may be present.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

Embodiments of the invention provide systems, apparatuses, and methods for localization detection in indoor environments. U.S. patent application Ser. No. 14/830,668 filed on Aug. 19, 2015, which is incorporated by reference herein, discloses techniques for RF-based localization. Specifically, the systems, apparatuses, and methods implement localization in a wireless sensor network that primarily uses a tree network structure for communication with periodic mesh-based features for path length estimation when localization is needed. The wireless sensor network has improved accuracy of localization while simultaneously providing good quality of indoor communication by using high-frequencies for localization and lower frequencies for communication.

Tree-like wireless sensor networks are attractive for many applications due to their reduced power requirements associated with the radio signal reception functionality. An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein.

Another type of wireless network that is often used is a mesh network. In this network, communication occurs between one or more neighbors, and information may then be passed along the network using a multi-hop architecture. This may be used to reduce transmit power requirements, since information is sent over shorter distances. On the other hand, receive radio power requirements may increase, since it is necessary for the receive radios to be on frequently to enable the multi-hop communication scheme.

Based on using the time of flight of signals between nodes in a wireless network, it is possible to estimate distance between individual pairs of nodes in a wireless network by exploiting the fact that the speed of signal propagation is relatively constant. Embodiments of the present network architecture allow measuring multiple pairs of path lengths and performing triangulation and then estimating the relative location of individual nodes in three-dimensional space.

FIG. 1 illustrates an exemplar system of wireless nodes in accordance with one embodiment. This exemplar system 100 includes wireless nodes 110-116. The nodes communicate bi-directionally with communications 120-130 (e.g., node identification information, sensor data, node status information, synchronization information, localization information, other such information for the wireless sensor network, time of flight (TOF) communications, etc.). Based on using time of flight measurements, path lengths between individual pairs of nodes can be estimated. An individual time of flight measurement between nodes 110 and 111 for example, can be achieved by sending a signal at a known time from node 110 to node 111. Node 111 receives the signal, records a time stamp of reception of the signal of the communications 120, and can then, for example, send a return signal back to A, with a time stamp of transmission of the return signal. Node 110 receives the signal and records a time stamp of reception. Based on these two transmit and receive time stamps, an average time of flight between nodes 110 and 111 can be estimated. This process can be repeated multiple times and at multiple non-contiguous or discontinuous frequency channels to increase a frequency bandwidth to improve precision and to eliminate or reduce degradation due to poor channel quality at a specific frequency. A set of path lengths can be estimated by repeating this process for various node pairs. For example, in FIG. 1, the path lengths are TOF 150-160. Then, by using a geometric model, the relative position of individual nodes can be estimated based on a triangulation-like process.

This triangulation process is not feasible in a tree-like network, since only path lengths between any node and a hub can be measured. This then limits localization capability of a tree network. To preserve the energy benefits of a tree network while allowing localization, in one embodiment of this invention, a tree network for communication is combined with mesh-like network functionality for localization. Once localization is complete with mesh-like network functionality, the network switches back to tree-like communication and only time of flights between the nodes and the hub are measured periodically. Provided these time of flights are held relatively constant, the network then assumes nodes have not moved and does not waste energy is attempting to re-run mesh-based localization. On the other hand, when a change in path length in the tree network is detected, the network switches to a mesh-based system and re-triangulates to determine location of each node in the network.

Figure 2:
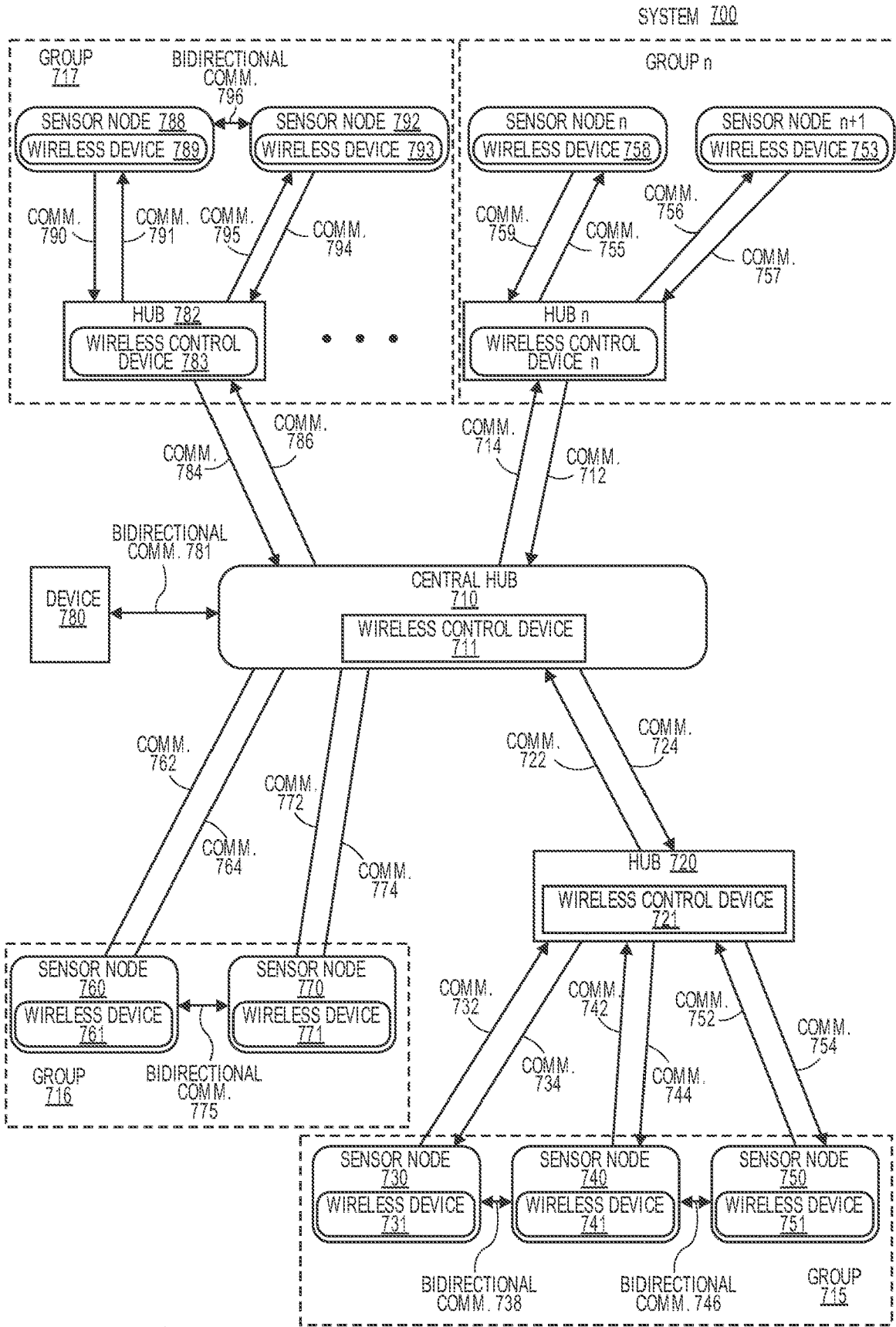
FIG. 2 shows a system with an asymmetric tree and mesh network architecture having multiple hubs for communicating in accordance with one embodiment.

FIG. 2 shows a system with an asymmetric tree and mesh network architecture having multiple hubs for communicating in accordance with one embodiment. The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and a guaranteed time signal for each group.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

By using the architectures illustrated in FIGS. 1-2, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

Figure 3:
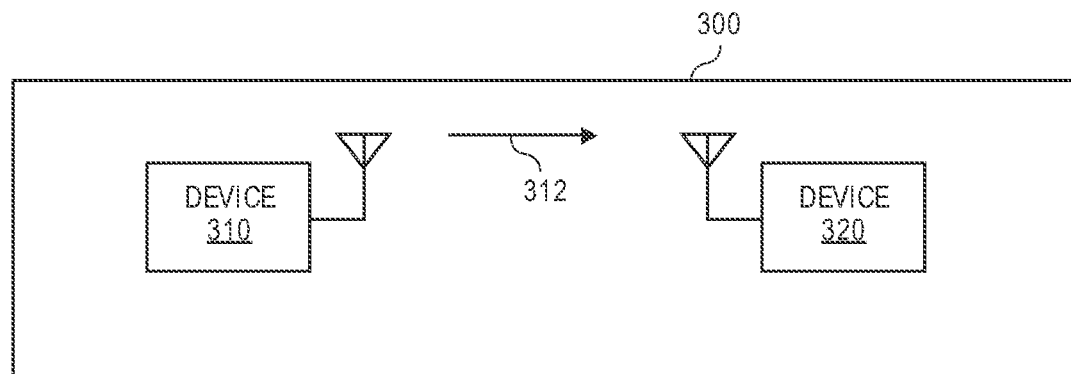
FIG. 3 illustrates a time of flight measurement system in accordance with one embodiment.

To determine the distance between two objects based on RF, ranging measurements are performed (i.e., RF communication is used to estimate the distance between the pair of objects). To achieve this, an RF signal is sent from one device to another. FIG. 3 illustrates a time of flight measurement system in accordance with one embodiment. A transmitting device 310 sends an RF signal 312, and a receiving device 320 receives the RF signal 312, as shown in FIG. 3. Here, in an exemplary wireless network, the device 310 may be a hub or a node, and the device 320 may also be a hub or a node.

Figure 4:
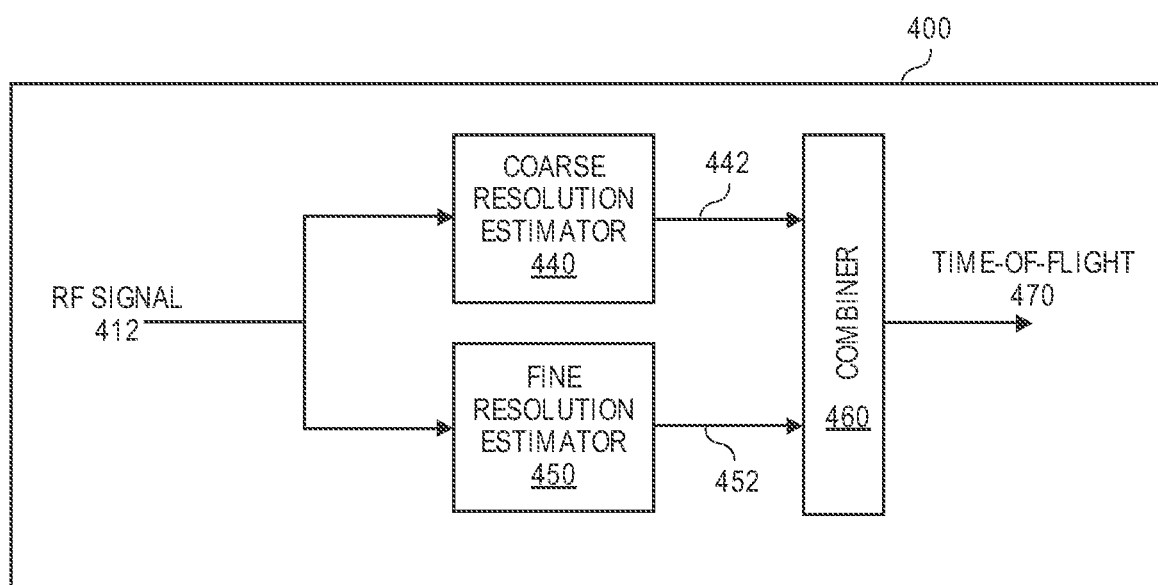
FIG. 4 illustrates a block diagram of a time of flight measurement system in accordance with one embodiment.

FIG. 4 illustrates a block diagram of a time of flight measurement system in accordance with one embodiment. A receiving device (e.g., device 320) receives the transmission from the transmitting device (e.g., device 310) and processes the RF signal 412 to generate at least one coarse estimation 442 using a coarse resolution estimator 440 and at least one fine estimation 452 of the propagation delay between the two devices over the air using a fine resolution estimator 450. The system 400 then utilizes a combiner 460 to combine the coarse time estimation 442 and the fine time estimation 452 to generate an accurate time-of-flight measurement 470. This time-of-flight measurement 470 can then be multiplied by the speed of light to calculate the distance, as shown in FIG. 4.

Figure 5A:
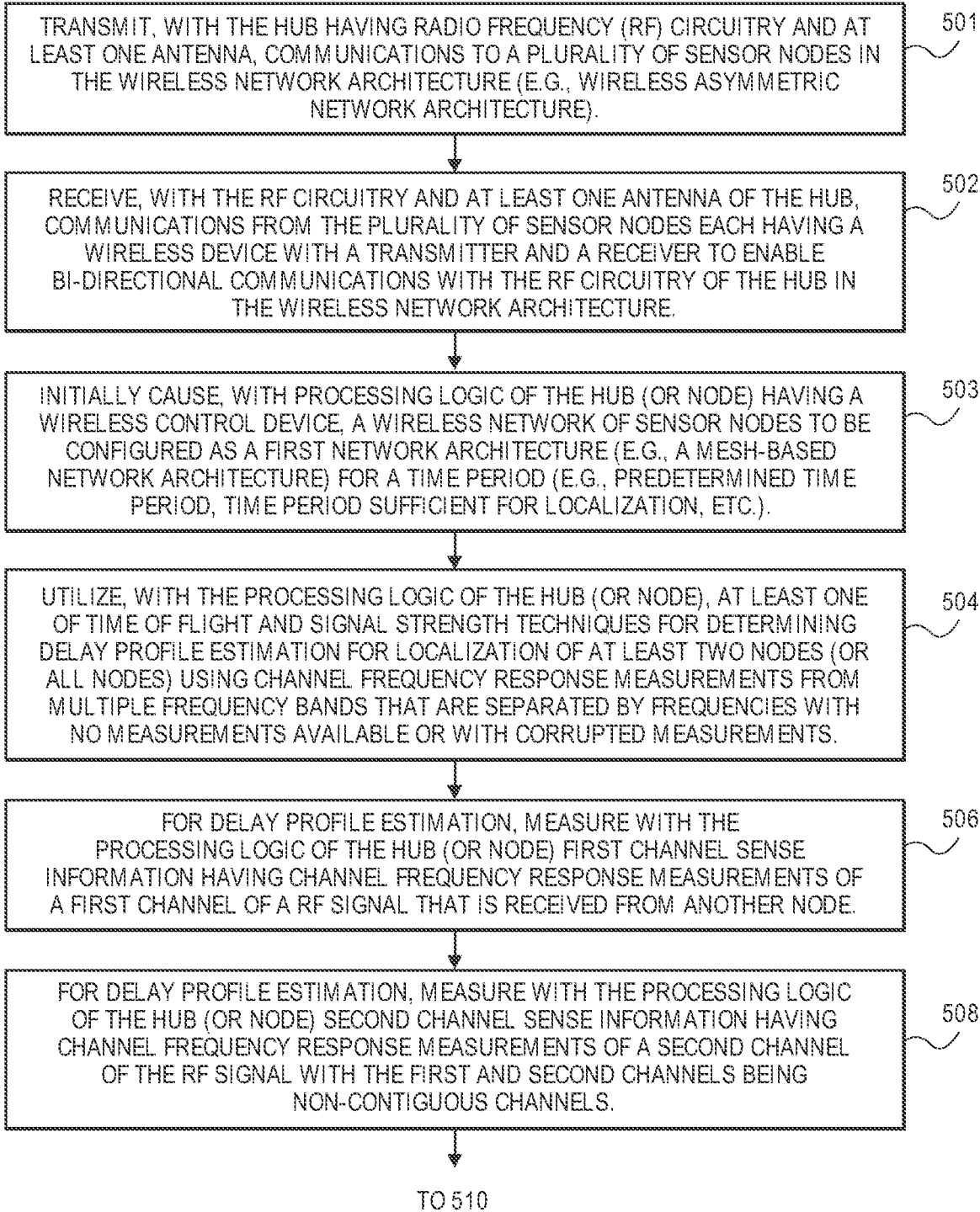
FIGS. 5A and 5B illustrate a method for delay profile estimation to determine location estimation of nodes in accordance with one embodiment.
Figure 5B:
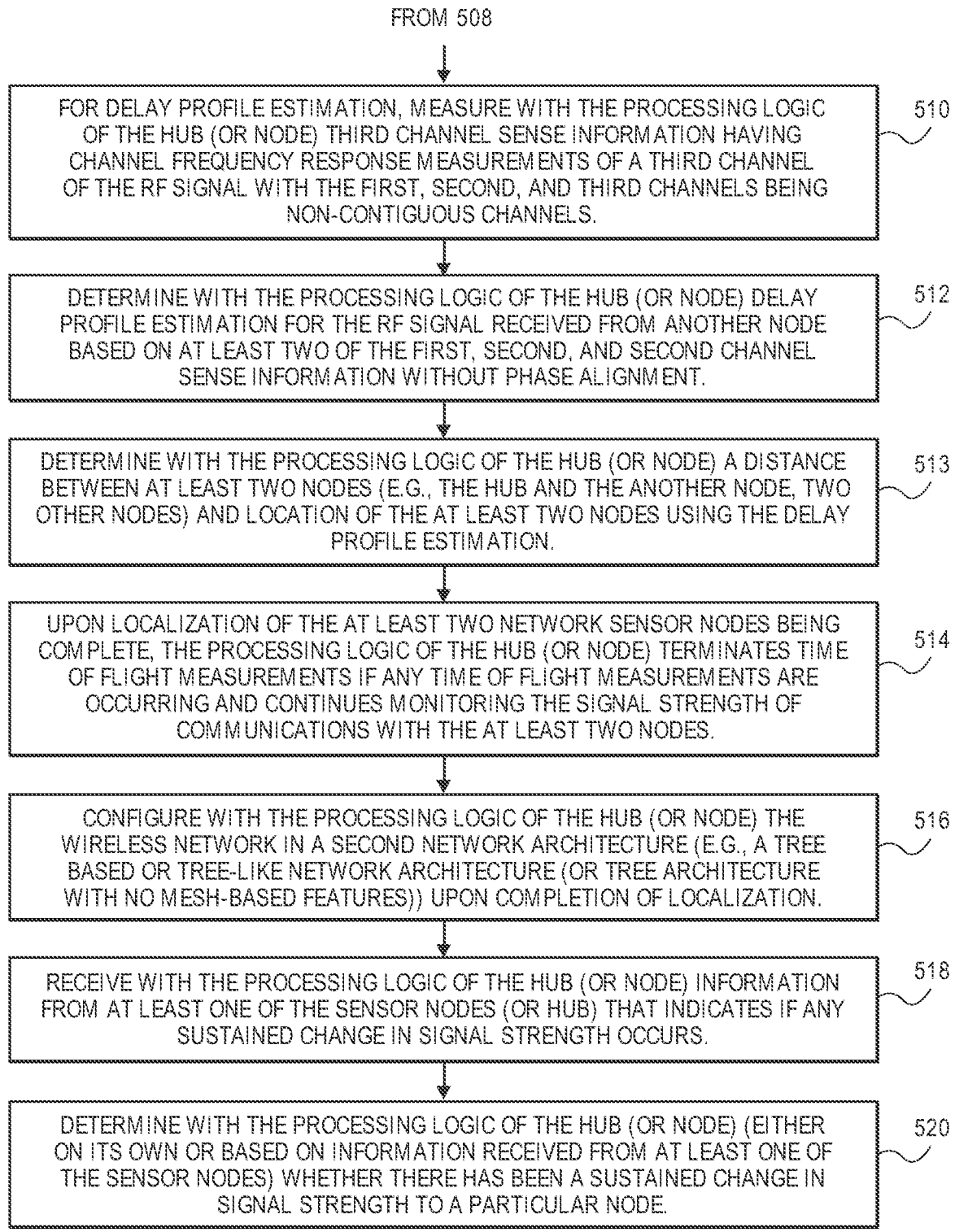

FIGS. 5A and 5B illustrate a method for delay profile estimation to determine location estimation of nodes in accordance with one embodiment. The operations of method 500 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 500.

At operation 501, the hub having radio frequency (RF) circuitry and at least one antenna transmits communications to a plurality of sensor nodes in the wireless network architecture (e.g., wireless asymmetric network architecture). At operation 502, the RF circuitry and at least one antenna of the hub receives communications from the plurality of sensor nodes each having a wireless device with a transmitter and a receiver to enable bi-directional communications with the RF circuitry of the hub in the wireless network architecture. At operation 503, processing logic of the hub (or node) having a wireless control device initially causes a wireless network of sensor nodes to be configured as a first network architecture (e.g., a mesh-based network architecture) for a time period (e.g., predetermined time period, time period sufficient for localization, etc.). At operation 504, the processing logic of the hub (or node) utilizes at least one of time of flight and signal strength techniques for determining delay profile estimation for localization of at least two nodes (or all nodes) using channel frequency response measurements (e.g., channel state information) from multiple frequency bands that are separated by frequencies with no measurements available or with corrupted measurements. At operation 506, for delay profile estimation, the processing logic of the hub (or node) measures first channel state information having channel frequency response measurements of a first channel of a RF signal that is received from another node. At operation 508, for delay profile estimation, the processing logic of the hub (or node) measures second channel state information having channel frequency response measurements of a second channel of the RF signal with the first and second channels being non-contiguous or discontinuous channels. At operation 510, for delay profile estimation, the processing logic of the hub (or node) measures third channel state information having channel frequency response measurements of a third channel of the RF signal with the first, second, and third channels being non-contiguous or discontinuous channels. For delay profile estimation, the processing logic of the hub (or node) may measure additional channel state information of additional channels of the RF signal with the first, second, third, and additional channels being non-contiguous or discontinuous channels.

At operation 512, the processing logic of the hub (or node) determines delay profile estimation for the RF signal received from another node based on at least two of the first, second, and second channel state information without phase alignment. At operation 513, the processing logic of the hub (or node) determines a distance between at least two nodes (e.g., the hub and the another node, two other nodes) and location of the at least two nodes using the delay profile estimation.

At operation 514, upon localization of the at least two network sensor nodes being complete, the processing logic of the hub (or node) terminates time of flight measurements if any time of flight measurements are occurring and continues monitoring the signal strength of communications with the at least two nodes. Similarly, the at least two nodes may monitor the signal strength of communications with the hub.

At operation 516, the processing logic of the hub (or node) configures the wireless network in a second network architecture (e.g., a tree based or tree-like network architecture (or tree architecture with no mesh-based features)) upon completion of localization. At operation 518, the processing logic of the hub (or node) may receive information from at least one of the sensor nodes (or hub) that indicates if any sustained change in signal strength occurs. Then, at operation 520, the processing logic of the hub (or node) determines (either on its own or based on information received from at least one of the sensor nodes) whether there has been a sustained change in signal strength to a particular node. If so, the method returns to operation 503 with the processing logic of the hub configuring the network as the first network architecture for a time period and re-triggering localization at operation 504 using non-contiguous or discontinuous channels for at least one of time of flight and signal strength techniques (e.g., time of flight and signal strength techniques) disclosed herein. Otherwise, if no sustained change in signal strength for a particular node, then the method returns to operation 516 and the network continues to have the second network architecture.

A channel frequency response measured by a receiver can be expressed as a sum of exponentials (a1*e^(j*w*t1+j*p1)+ a2*e^(j*w*t2+j*p2)+ ... ), each created by a transmitted signal that was delayed due to reflections and thus a longer path between the transmitter and receiver occurs. In some applications, it is important to accurately estimate the delay profile between the two devices. It is known how to obtain each e^(j*w*t) component from continuous N-point frequency response measurement [h(1),h(2) ... h(N)]:

e^(j*w*t1) ... e^(j*w*tk) are the k eigenvalues of matrix product $$\begin{bmatrix} h(1) & k(2) & \dots & h(L-1) \\ h(2) & & & h(L-2) \\ \vdots & & \ddots & \vdots \\ h(N-L) & & \dots & h(N-1) \end{bmatrix}^{-1} \cdot \begin{bmatrix} h(2) & m(3) & \dots & h(L) \\ h(3) & & & h(L-1) \\ \vdots & & \ddots & \vdots \\ h(N-L+1) & & \dots & h(N) \end{bmatrix}$$

where power of −1 indicates matrix pseudo inverse
The remaining exponentials can be solved:

$$[a1^*e^\wedge(j^*p1) \dots ak^*e^\wedge(j^*pk)] =$$

$$\begin{bmatrix} 1 & \cdots & 1 \\ e^\wedge(j^*w^*t1) & \cdots & e^\wedge(j^*w^*tk) \\ e^\wedge(j^*w^*t1^*2) & & e^\wedge(j^*w^*tk^*2) \\ \vdots & \ddots & \vdots \\ e^\wedge(j^*w^*t1^*(N-1)) & \cdots & e^\wedge(j^*w^*tk^*(N-1)) \end{bmatrix}^{-1} \cdot \begin{bmatrix} m(1) \\ \vdots \\ m(N) \end{bmatrix}$$

The accuracy of the delay profile estimate is proportional to the bandwidth or how many samples there are in the frequency response measurement. Measuring the frequency response in the middle of the used radio channel (e.g., in WiFi there is a 1 MHz gap in the middle of the channel) is difficult. Thus, measuring the frequency response based on one half of the radio channel cuts the bandwidth in half or if a gap in the radio channel is ignored then this introduces error to the estimation.

Figure 6:
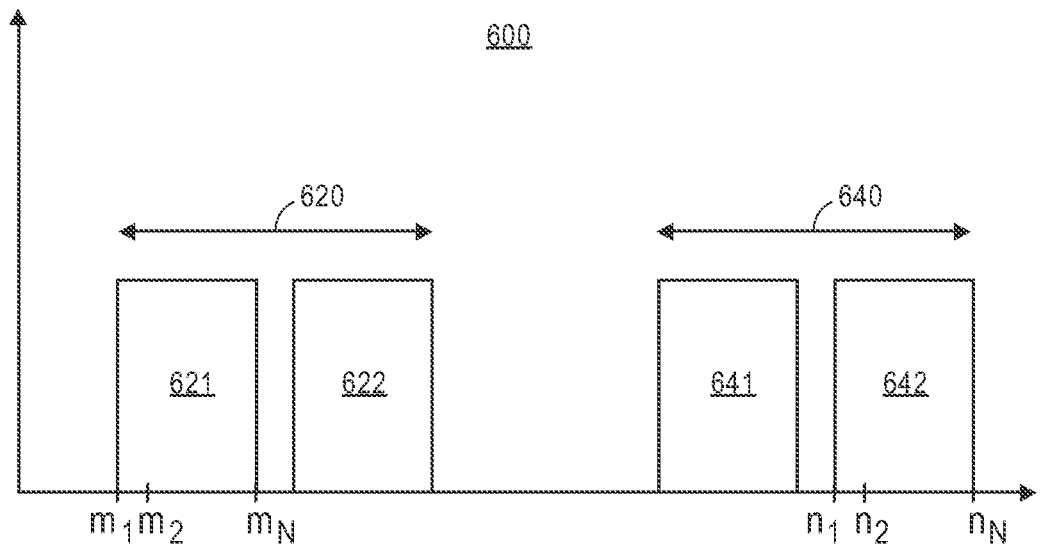
FIG. 6 illustrates a diagram 600 for localization of nodes using non-contiguous or discontinuous channels in accordance with one embodiment.

It may not be possible using conventional techniques to obtain a wide enough channel bandwidth to reach a desired accuracy for locationing. In one example, if trying to combine several narrow bandwidth channels these channels may not be contiguous. Even if contiguous channels are found, these channels have to be later phase aligned since measurements are done at random times with unknown local oscillator phase. All of the above problems can be solved by introducing a new non-contiguous or discontinuous method (e.g., method 500) that allows skipping a gap of a channel (e.g., channel center) and combining non-contiguous or discontinuous channels without phase alignment:

$e^{\wedge}(j*w*t1) \ldots e^{\wedge}(j*w*tk)$ are the k eigenvalues of this new matrix product $$\begin{bmatrix} m(1) & m(2) & \ldots & m(L-1) \\ m(2) & & \ldots & m(L-2) \\ \vdots & \ddots & & \vdots \\ m(N-L) & & \ldots & m(N-1) \\ n(1) & n(2) & \ldots & n(L-1) \\ n(2) & & \ldots & n(L-2) \\ \vdots & \ddots & & \vdots \\ n(N-L) & & \ldots & n(N-1) \end{bmatrix}^{-1} \cdot \begin{bmatrix} m(2) & m(3) & \ldots & m(L) \\ m(3) & & \ldots & m(L-1) \\ \vdots & \ddots & & \vdots \\ m(N-L+1) & & \ldots & m(N) \\ n(2) & m(3) & \ldots & n(L) \\ n(3) & & \ldots & n(L-1) \\ \vdots & \ddots & & \vdots \\ n(N-L+1) & & \ldots & n(N) \end{bmatrix}$$

where m( ) and n( ) are two sets of measurements creating two row sections that have some frequency or phase gap between these measurements as illustrated in FIGS. 6-7. L is selected to manage a signal to noise ratio of the estimation. A number of measurement sets is not limited to two. The remaining exponentials can be solved as in prior art but either with measurements n( ) or m( )

$$[a1^*e^{\wedge}(j^*p1) \ldots ak^*e^{\wedge}(j^*pk)] = \begin{bmatrix} 1 & & 1 \\ e^{\wedge}(j^*w^*t1) & \cdots & e^{\wedge}(j^*w^*tk) \\ e^{\wedge}(j^*w^*t1^*2) & & e^{\wedge}(j^*w^*tk^*2) \\ \vdots & \ddots & \vdots \\ e^{\wedge}(j^*w^*t1^*(N-1)) & \cdots & e^{\wedge}(j^*w^*tk^*(N-1)) \end{bmatrix}^{-1} \cdot \begin{bmatrix} m(1) \\ \vdots \\ m(N) \end{bmatrix}$$

The delay profile estimation method uses channel frequency response measurements (e.g., channel state information) from multiple frequency blocks that are separated by frequencies with no measurements available or with corrupted measurement. In a first example, the method uses a first matrix with as many separate row sections as there are separate frequency blocks (e.g., channels 621-622, channels 641-642 of FIG. 6) available for the estimator and each section containing all the measurements from its corresponding frequency block in the section's diagonals starting from the left upper corner with the first measurement and ending at the lower right corner with the last measurement. Each row section of a frequency block contains more rows than a number of measurements (e.g., number of columns) within one row.

In a second example, a second matrix is formed by removing the last column from the first matrix and a third matrix is formed by removing the first column from the first matrix and then multiplying a pseudo inverse of the second matrix with the third matrix.

In a third example, the phase of the k eigenvalues of the product of the second and third matrices are used to indicate the delays relative to the frequency separation between the frequency response measurements.

In a fourth example, the length of one row is generated assuming a certain number of delays in the delay profile.

In a fifth example, the length of one row is based on the signal quality reported by the receiver of the hub (or node).

In a sixth example, the amplitudes and phases of the delays are estimated by first forming a fourth matrix containing each of the k eigenvalues in a column and raising each eigenvalue to the power indicated by the row starting from zero and going to as high as the number of measurements in one of the frequency blocks. Then, the method multiplies the measurement vector from that frequency block with pseudo inverse of the fourth matrix.

In a seventh example, the phase and amplitude estimation are generated separately for each of the frequency blocks and then the amplitude estimates are averaged to get more accurate results.

FIG. 6 illustrates a diagram 600 for localization of nodes using non-contiguous or discontinuous channels in accordance with one embodiment. The diagram 600 illustrates a frequency band 620 having non-contiguous or discontinuous frequency channels 621-622 and a frequency band 640 having non-contiguous or discontinuous frequency channels 641-642 on a horizontal axis. Measurements $m(m_1, m_2, \ldots m_n)$ are obtained from the channels 621. Measurements $n(n_1, n_2, \ldots n_n)$ are obtained from the channels 642. No signals are found on channels 622 and 641 or have been determined to have low quality. Measurements n( ) and m( ) are obtained from the channels 621 and 642 to generate a first matrix that is larger than any matrices formed of the individual channels. In one example, the first matrix is twice the size of equivalent matrices of the individual channels 621-642. The frequency bands 620 and 640 can be similar in frequency (e.g., 2.4 GHz and 5 GHz) to a WiFi frequency band or have different frequency bands.

Figure 7A:
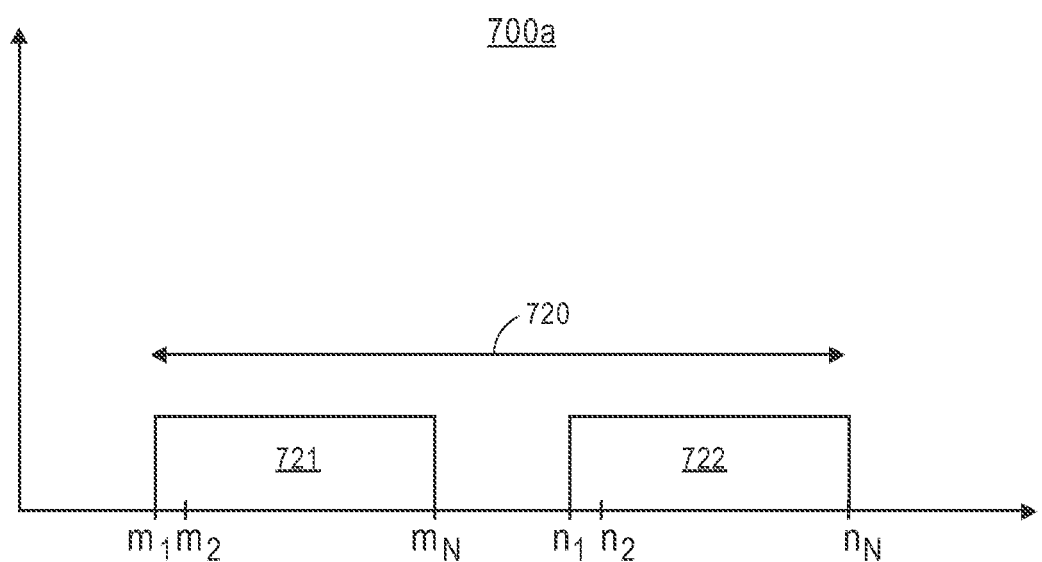
FIG. 7A illustrates a diagram 700a for localization of nodes using non-contiguous or discontinuous channels in accordance with one embodiment.

FIG. 7A illustrates a diagram 700a for localization of nodes using non-contiguous or discontinuous channels in accordance with one embodiment. The diagram 700 illustrates a frequency channel 720 having non-contiguous or discontinuous frequency response 721-722 on a horizontal axis. Measurements $m(m_1, m_2, \ldots m_n)$ are obtained from the frequency range 721 and measurements $n(n_1, n_2, \ldots n_n)$ are obtained from the frequency range 722. In one example, the frequency channel 720 is approximately twice the size of a frequency range of the individual portions 721 and 722. The frequency band 720 can be similar in frequency (e.g., 5 GHz or 2.4 GHz) to a WiFi frequency band or have different frequency bands.

Figure 7B:
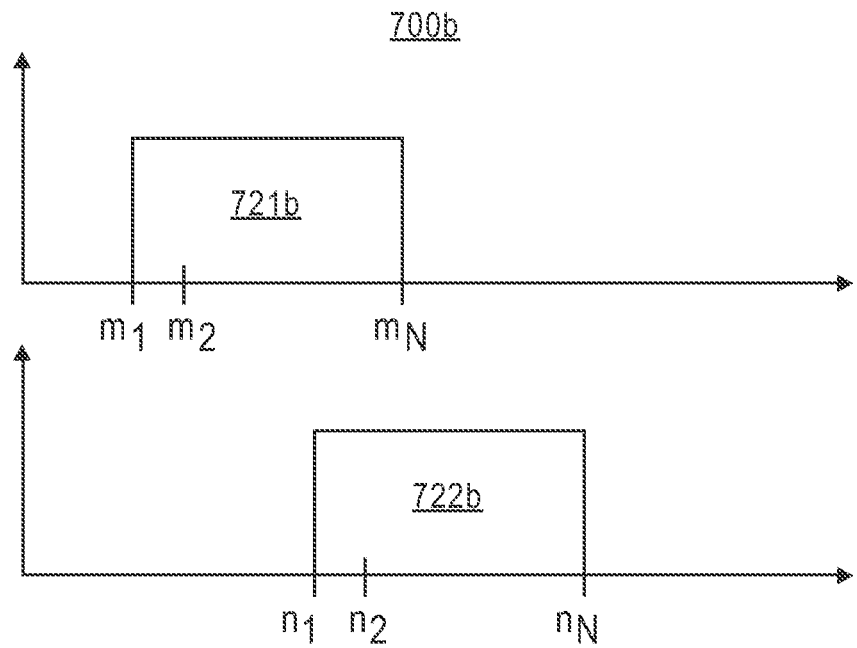
FIG. 7B illustrates diagram 700b for localization of nodes using non-contiguous or discontinuous channels in accordance with one embodiment.

FIG. 7B illustrates diagram 700b for localization of nodes using non-contiguous or discontinuous channels in accordance with one embodiment. The diagram 700b illustrates frequency channels 721b-722b on a horizontal axis. Measurements $m(m_1, m_2, \ldots m_n)$ are obtained from the channel 721b and measurements $n(n_1, n_2, \ldots n_n)$ are obtained from the channel 722b. In one example, the combined amount of measurements from m( ) and n( ) is twice the size of the individual measurements.

Figure 7C:
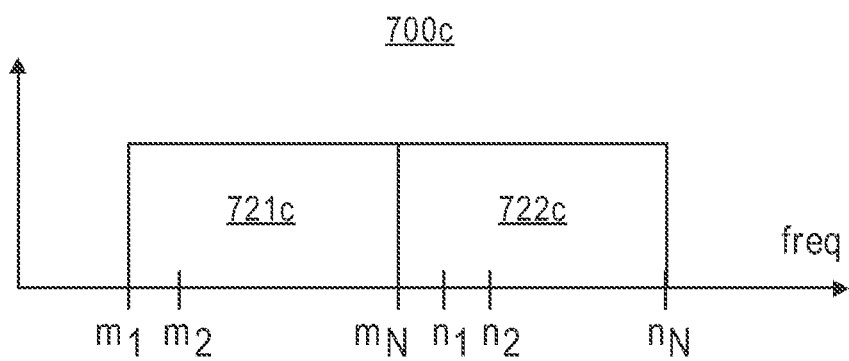
FIG. 7C illustrates diagram 700c for a localization of nodes using discontinuous channel response in accordance with one embodiment.
Figures 8A, 8B:
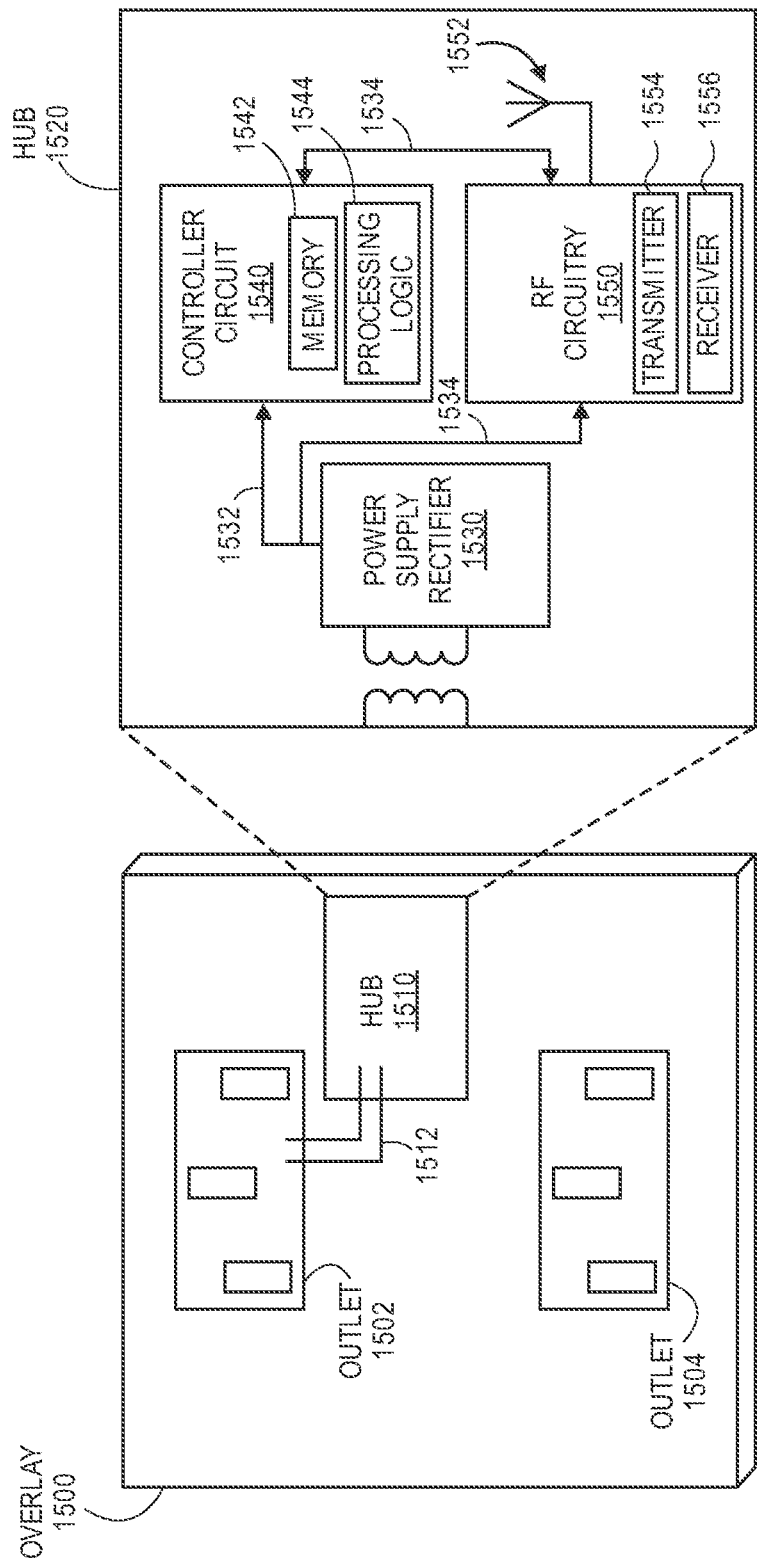
FIG. 8A shows an exemplary embodiment of a hub implemented as an overlay 1500 for an electrical power outlet in accordance with one embodiment.
FIG. 8B shows an exemplary embodiment of an exploded view of a block diagram of a hub implemented as an overlay for an electrical power outlet in accordance with one embodiment.

FIG. 7C illustrates diagram 700c for a localization of nodes using discontinuous channel response in accordance with one embodiment. The diagram 700c illustrates frequency channels 721c-722c on a horizontal axis. Measurements $m(m_1, m_2, \ldots m_n)$ are obtained from the channel 721c and measurements $n(n_1, n_2, \ldots n_n)$ are obtained from the channel 722c. Measurements are obtained at different moments of time or by different devices causing the two channel responses to have random phase.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs may be implemented in a variety of ways including combining non-contiguous or discontinuous communications.

In embodiments where the network is asymmetric, such that the hub is bigger or has more available power than the nodes, it may be advantageous to use multiple antennas on the hub to estimate angle of arrival of the communication with the nodes. This may be used in conjunction with the other localization techniques disclosed herein to improve localization accuracy and/or identify the existing of reflected paths of transmission. Similarly, multiple antennas may also be used in some or all of the nodes to achieve similar benefits with respect to node-to-node or hub-to-node transmission reception for the purpose of localization.

The hubs may be physically implemented in numerous ways in accordance with embodiments of the invention. FIG. 9A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

Figure 9B:
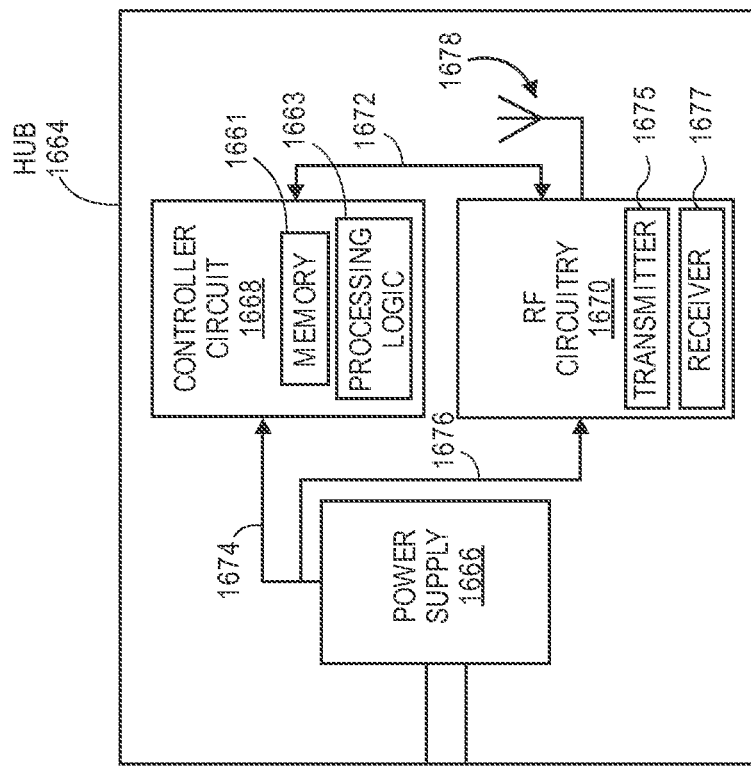
FIG. 9B shows an exemplary embodiment of a block diagram of a hub 964 implemented as a card for deployment in a computer system, appliance, or communication hub in accordance with one embodiment.
Figure 9A:
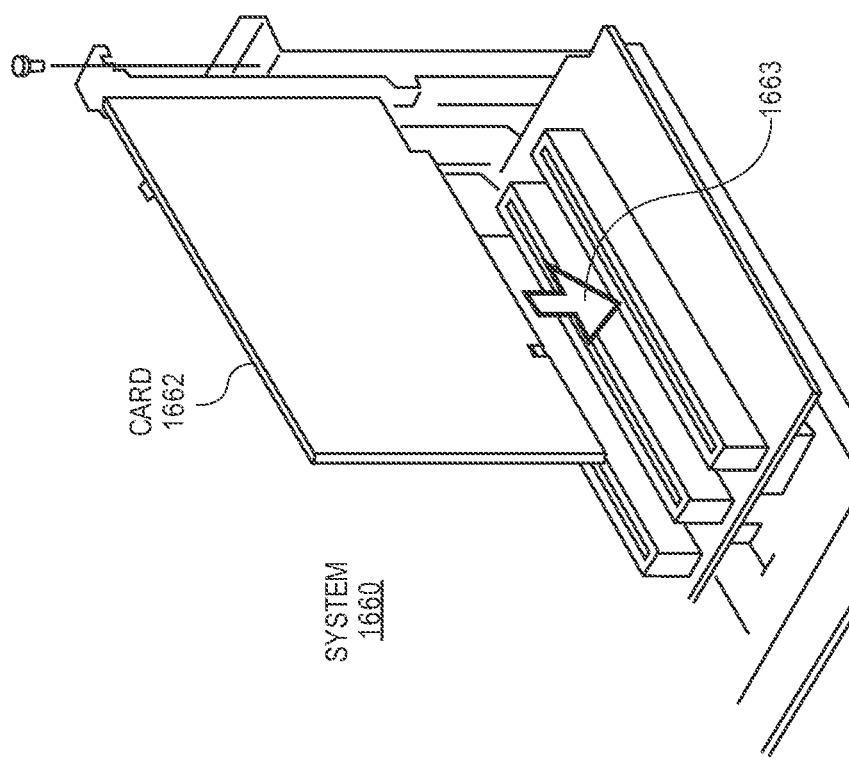
FIG. 9A shows an exemplary embodiment of a hub implemented as a card for deployment in a computer system, appliance, or communication hub in accordance with one embodiment.
Figure 9D:
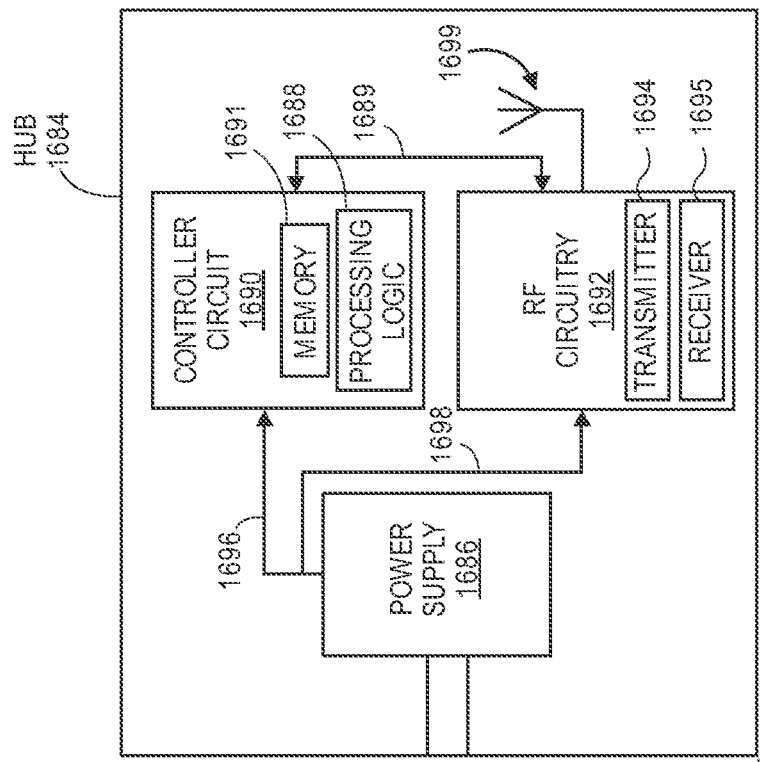
FIG. 9D shows an exemplary embodiment of an exploded view of a block diagram of a hub 1684 implemented within an appliance (e.g., smart washing machine, smart refrigerator, smart thermostat, other smart appliances, etc.) in accordance with one embodiment.
Figure 9C:
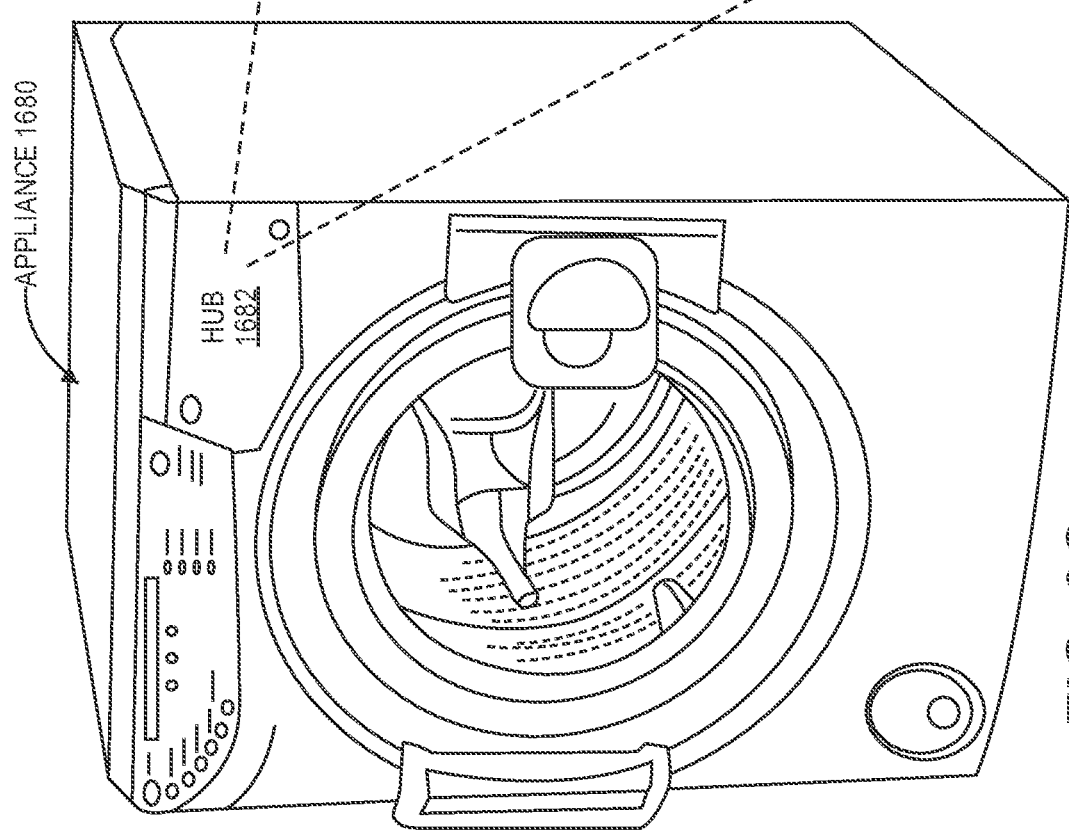
FIG. 9C shows an exemplary embodiment of a hub implemented within an appliance (e.g., smart washing machine, smart refrigerator, smart thermostat, other smart appliances, etc.) in accordance with one embodiment.

FIG. 9B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 10:
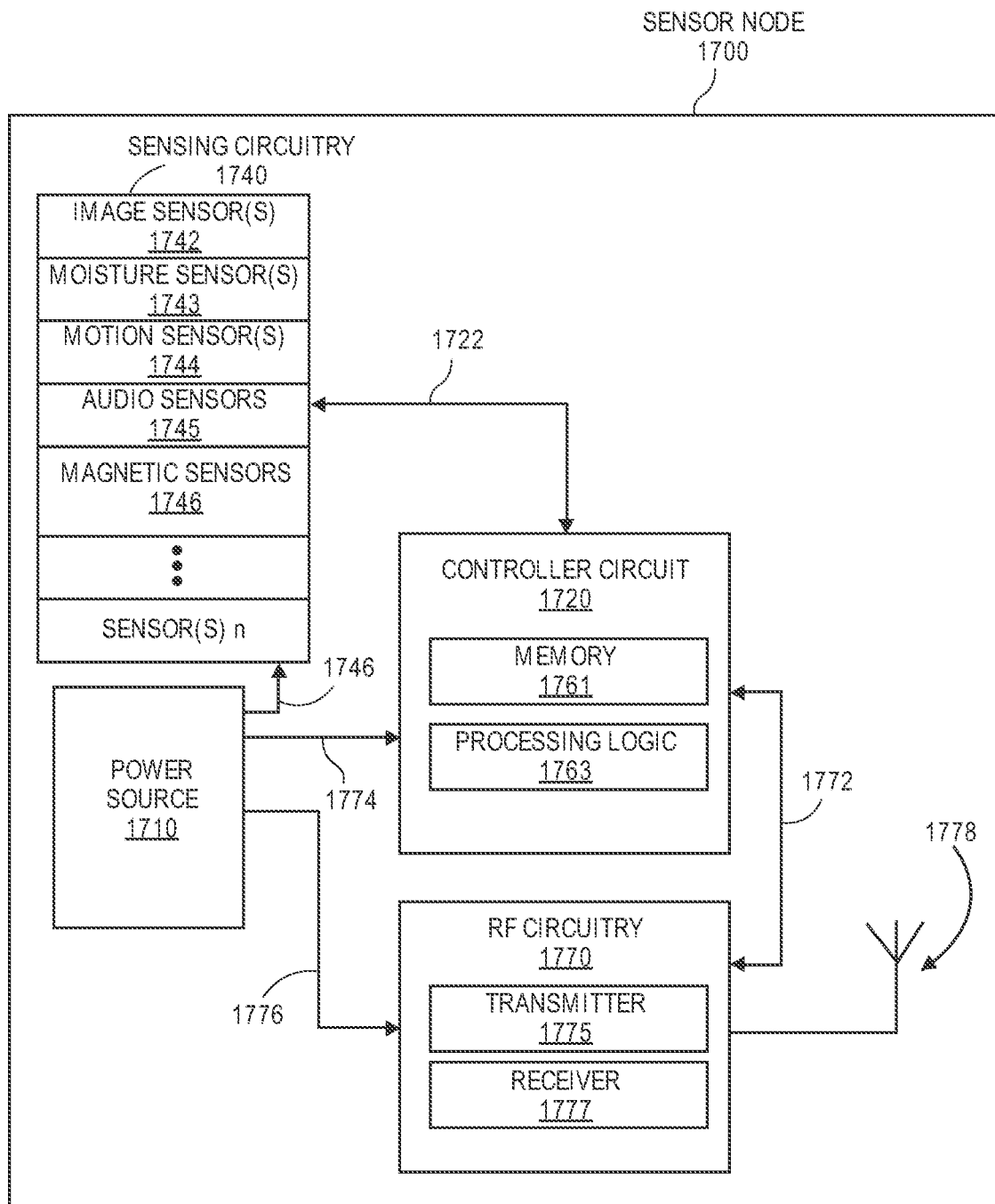
FIG. 10 illustrates a block diagram of a sensor node in accordance with one embodiment.

FIG. 10A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 10B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 10C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 10D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuity 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture.

In one example, the apparatus is powered by a mains electrical source and the plurality of sensor nodes are each powered by a battery source to form the wireless network architecture.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 11:
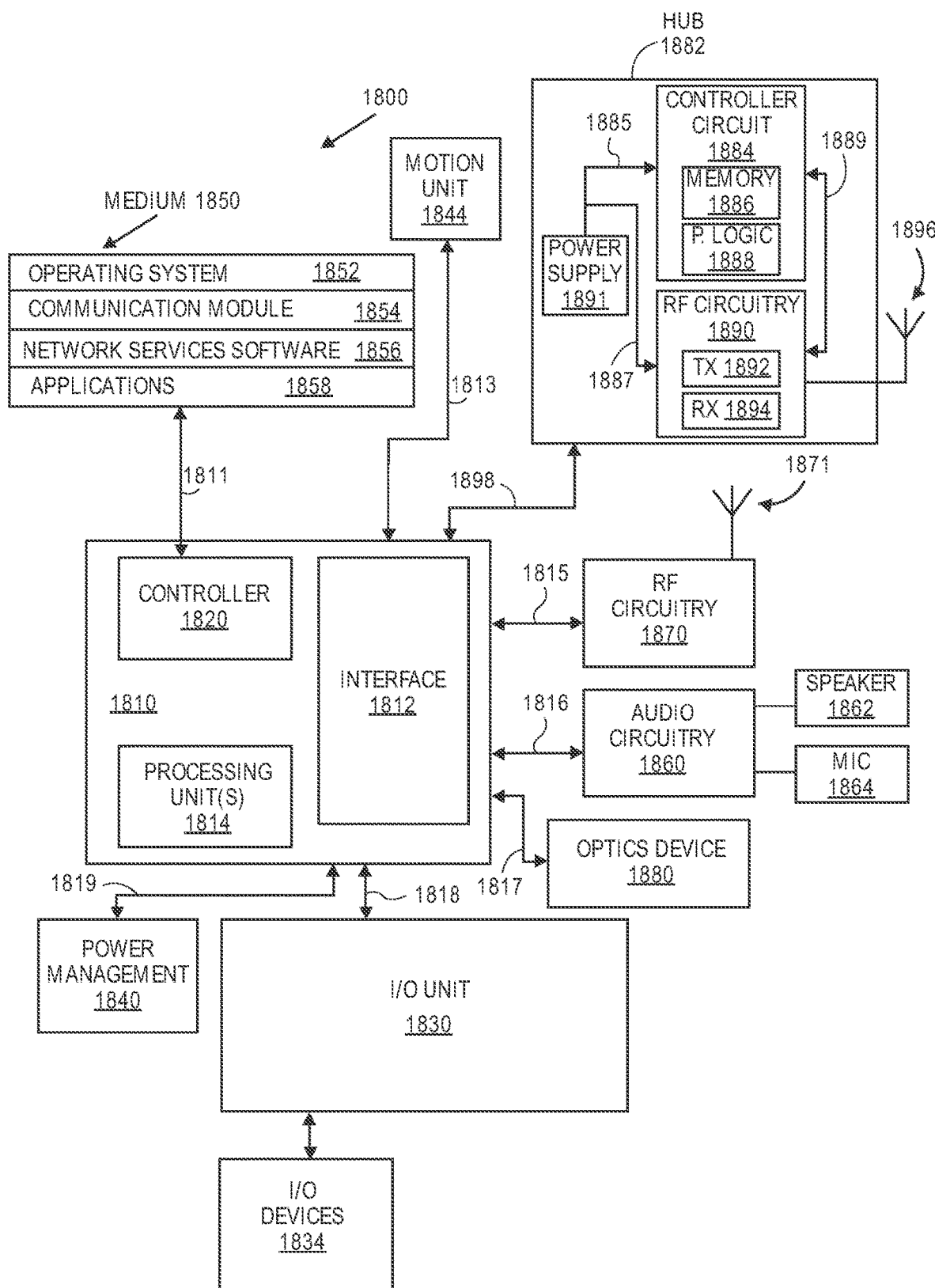
FIG. 11 illustrates a block diagram of a system or appliance 1800 having a hub in accordance with one embodiment.

FIG. 11 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other sensed information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

FIG. 12 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

In one embodiment, a method for localization of nodes in a wireless network architecture comprises receiving, with processing logic of a first wireless node having a wireless device, a RF signal from a second wireless node having a wireless device, measuring, with the first wireless node, first channel state information of a first frequency channel of the RF signal, measuring, with the first wireless node, second channel state information of a second frequency channel of the RF signal with the first and second frequency channels being non-contiguous or discontinuous channels, and determining delay profile estimation between the first and second wireless nodes based on the first and second channel state information without phase alignment.

In one example, the delay profile estimation is determined without channel state information for a frequency band gap between the first and second frequency channels In another example, the method includes measuring, with the first wireless node, third channel state information of a third frequency channel of the RF signal with the first, second, and third frequency channels being non-contiguous or discontinuous channels.

In another example, the method includes determining a distance between the first and second wireless nodes using the delay profile estimation.

In another example, determining delay profile estimation between the first and second wireless nodes comprises generating a first matrix having a separate row section for each separate frequency channel with each row containing part of the channel state information for that channel.

In another example, determining delay profile estimation between the first and second wireless nodes comprises generating a second matrix by removing a last column from the first matrix and generating a third matrix by removing a first column from the first matrix and then multiplying a pseudo inverse of the second matrix with the third matrix.

In another example, phases of k eigenvalues of a product of the second and third matrices are used to indicate delays relative to the frequency separation between the first and second channel information.

In another example, the amplitudes and phases of the delays are estimated by first forming a fourth matrix containing each of the k eigenvalues in a column and raising each eigenvalue to the power indicated by a row starting from zero and going to as high as a number of measurements in one frequency block of the first or second channel state information and then multiply the measurement vector from that frequency block with a pseudo inverse of the fourth matrix.

In another example, the phase and amplitude estimation are generated separately for each of the frequency blocks of the first and second channel state information.

In one embodiment, a system for localization of nodes in a wireless network architecture includes a first wireless node having a wireless device with one or more processing units and RF circuitry for transmitting and receiving communications in the wireless network architecture including a RF signal and a second wireless node having a wireless device with one or more processing units and RF circuitry to enable bi-directional communications with the first wireless node in the wireless network architecture. The one or more processing units of the first wireless node are configured to execute instructions to receive the RF signal from the second wireless node, to measure first channel state information of a first frequency channel of the RF signal, to measure second channel state information of a second frequency channel of the RF signal with the first and second frequency channels being non-contiguous or discontinuous channels, and to determine delay profile estimation between the first and second wireless nodes based on the first and second channel state information without phase alignment.

In another example, the delay profile estimation is determined without channel state information for a frequency band gap between the first and second channels.

In another example, the one or more processing units of the first wireless node are configured to execute instructions to measure third channel state information of a third frequency channel of the RF signal with the first, second, and third channels being non-contiguous or discontinuous channels.

In another example, the one or more processing units of the first wireless node are configured to execute instructions to determine a distance between the first and second wireless nodes using the delay profile estimation.

In another example, the delay profile estimation between the first and second wireless nodes is determined by generating a first matrix having a separate row section for each separate frequency channel with each row containing part of the channel state information for that channel.

In another example, the delay profile estimation between the first and second wireless nodes is determined by generating a second matrix by removing a last column from the first matrix and generating a third matrix by removing a first column from the first matrix and then multiplying a pseudo inverse of the second matrix with the third matrix.

In another example, phases of k eigenvalues of a product of the second and third matrices are used to indicate delays relative to the frequency separation between the first and second channel state information.

In one embodiment, an apparatus includes a memory for storing instructions, one or more processing units to execute instructions for controlling a plurality of sensor nodes in a wireless network architecture and determining locations of the plurality of sensor nodes, and radio frequency (RF) circuitry to transmit communications to and receive communications from the plurality of sensor nodes each having a wireless device with a transmitter and a receiver to enable bi-directional communications with the RF circuitry of the apparatus in the wireless network architecture. The one or more processing units of the apparatus are configured to execute instructions to receive a RF signal from a sensor node, to measure first channel state information of a first frequency channel of the RF signal, to measure second channel state information of a second frequency channel of the RF signal with the first and second frequency channels being non-contiguous or discontinuous channels, and to determine delay profile estimation between the apparatus and the sensor node based on the first and second channel state information without phase alignment.

In one example, the delay profile estimation is determined without channel state information for a frequency band gap between the first and second channels In another example, the one or more processing units of the apparatus are configured to execute instructions to measure third channel state information of a third frequency channel of the RF signal with the first, second, and third channels being non-contiguous or discontinuous channels.

In another example, the one or more processing units of the first wireless node are configured to execute instructions to determine a distance between the first and second wireless nodes using the delay profile estimation.

In another example, the delay profile estimation between the first and second wireless nodes is determined by generating a first matrix having a separate row section for each separate frequency channel.

In another example, the delay profile estimation between the first and second wireless nodes is determined by generating a second matrix by removing a last column from the first matrix and generating a third matrix by removing a first column from the first matrix and then multiplying a pseudo inverse of the second matrix with the third matrix.

In another example, phases of k eigenvalues of a product of the second and third matrices are used to indicate delays relative to the frequency separation between the first and second channel state information.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for localization of nodes in a wireless network architecture, comprising:
   receiving, with processing logic of a first wireless node having a wireless device, a RF signal from a second wireless node having a wireless device; and
   measuring, with the first wireless node, first channel state information of a first frequency channel of the RF signal;
   measuring, with the first wireless node, second channel state information of a second frequency channel of the RF signal from the second wireless node with the first and second frequency channels being different channels of the RF signal that are non-contiguous or discontinuous channels; and
   determining delay profile estimation between the first and second wireless nodes based on the first and second channel state information without phase alignment for separate measurements of the first and second channel state information.

2. The method of claim 1, wherein the delay profile estimation is determined without channel state information for a frequency band gap between the first and second frequency channels.

3. The method of claim 1, further comprising:
   measuring, with the first wireless node, third channel state information of a third frequency channel of the RF signal with the first, second, and third frequency channels being non-contiguous or discontinuous channels.

4. The method of claim 1, further comprising:
   determining a distance between the first and second wireless nodes using the delay profile estimation.

5. The method of claim 1, wherein determining delay profile estimation between the first and second wireless nodes comprises generating a first matrix having a separate row section for each separate frequency channel with each row containing part of the channel state information for that channel.

6. The method of claim 5, wherein determining delay profile estimation between the first and second wireless nodes comprises generating a second matrix by removing a last column from the first matrix and generating a third matrix by removing a first column from the first matrix and then multiplying a pseudo inverse of the second matrix with the third matrix.

7. The method of claim 6, wherein phases of k eigenvalues of a product of the second and third matrices are used to indicate delays relative to the frequency separation between the first and second channel information.

8. The method of claim 7, wherein amplitudes and phases of the delays are estimated by first forming a fourth matrix containing each of the k eigenvalues in a column and raising each eigenvalue to the power indicated by a row starting from zero and going to as high as a number of measurements in one frequency block of the first or second channel state information and then multiply the measurement vector from that frequency block with a pseudo inverse of the fourth matrix.

9. The method of claim 8, wherein the phase and amplitude estimation are generated separately for each of the frequency blocks of the first and second channel state information.

10. A system for localization of nodes in a wireless network architecture, comprising:
a first wireless node having a wireless device with one or more processing units and RF circuitry for transmitting and receiving communications in the wireless network architecture including a RF signal; and
a second wireless node having a wireless device with one or more processing units and RF circuitry to enable bi-directional communications with the first wireless node in the wireless network architecture, wherein the one or more processing units of the first wireless node are configured to execute instructions to receive the RF signal from the second wireless node, to measure first channel state information of a first frequency channel of the RF signal, to measure second channel state information of a second frequency channel of the RF signal from the second wireless node with the first and second frequency channels being different channels of the RF signal that are non-contiguous or discontinuous channels, and to determine delay profile estimation between the first and second wireless nodes based on the first and second channel state information without phase alignment for separate measurements of the first and second channel state information.

11. The system of claim 10, wherein the delay profile estimation is determined without channel state information for a frequency band gap between the first and second channels.

12. The system of claim 10, wherein the one or more processing units of the first wireless node are configured to execute instructions to measure third channel state information of a third frequency channel of the RF signal with the first, second, and third channels being non-contiguous or discontinuous channels.

13. The system of claim 10, wherein the one or more processing units of the first wireless node are configured to execute instructions to determine a distance between the first and second wireless nodes using the delay profile estimation.

14. The system of claim 10, wherein the delay profile estimation between the first and second wireless nodes is determined by generating a first matrix having a separate row section for each separate frequency channel with each row containing part of the channel state information for that channel.

15. The system of claim 14, wherein the delay profile estimation between the first and second wireless nodes is determined by generating a second matrix by removing a last column from the first matrix and generating a third matrix by removing a first column from the first matrix and then multiplying a pseudo inverse of the second matrix with the third matrix.

16. The system of claim 15, wherein phases of k eigenvalues of a product of the second and third matrices are used to indicate delays relative to the frequency separation between the first and second channel state information.

17. An apparatus, comprising:
a memory for storing instructions;
one or more processing units to execute instructions for controlling a plurality of sensor nodes in a wireless network architecture and determining locations of the plurality of sensor nodes; and
radio frequency (RF) circuitry to transmit communications to and receive communications from the plurality of sensor nodes each having a wireless device with a transmitter and a receiver to enable bi-directional communications with the RF circuitry of the apparatus in the wireless network architecture, wherein the one or more processing units of the apparatus are configured to execute instructions to receive a RF signal from a sensor node, to measure first channel state information of a first frequency channel of the RF signal, to measure second channel state information of a second frequency channel of the RF signal from the second wireless node with the first and second frequency channels being different channels of the RF signal that are non-contiguous or discontinuous channels, and to determine delay profile estimation between the apparatus and the sensor node based on the first and second channel state information without phase alignment for separate measurements of the first and second channel state information.

18. The apparatus of claim 17, wherein the delay profile estimation is determined without channel state information for a frequency band gap between the first and second channels.

19. The apparatus of claim 17, wherein the one or more processing units of the apparatus are configured to execute instructions to measure third channel state information of a third frequency channel of the RF signal with the first, second, and third channels being non-contiguous or discontinuous channels.

20. The apparatus of claim 17, wherein the one or more processing units of the first wireless node are configured to execute instructions to determine a distance between the first and second wireless nodes using the delay profile estimation.

21. The apparatus of claim 17, wherein the delay profile estimation between the first and second wireless nodes is determined by generating a first matrix having a separate row section for each separate frequency channel.

22. The apparatus of claim 21, wherein the delay profile estimation between the first and second wireless nodes is determined by generating a second matrix by removing a last column from the first matrix and generating a third matrix by removing a first column from the first matrix and then multiplying a pseudo inverse of the second matrix with the third matrix.

23. The apparatus of claim 22, wherein phases of k eigenvalues of a product of the second and third matrices are used to indicate delays relative to the frequency separation between the first and second channel state information.

* * * * *